J. S. GRANT.
Hay Rake.
No. 68,500.
Patented Sept. 3, 1867.
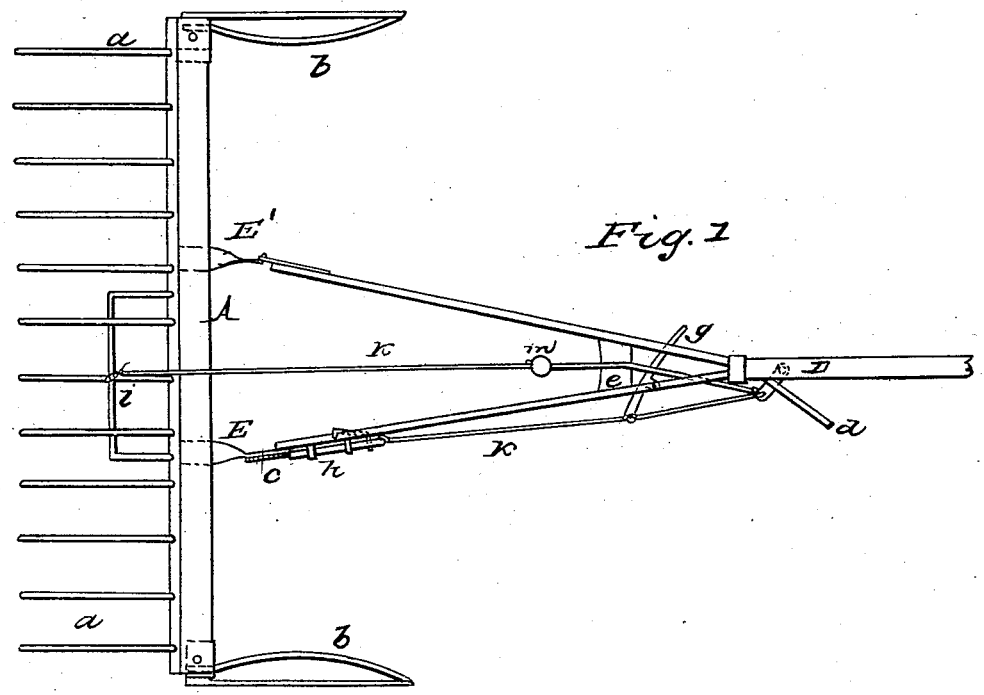
Fig. 1
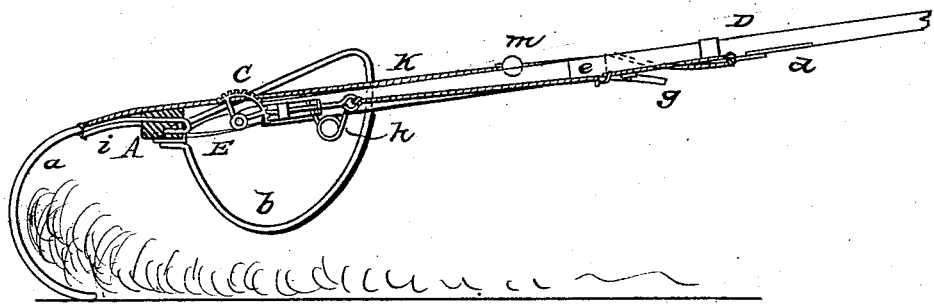
Witnesses
Theo Fische
J A Service
Inventor
J S Grant
Per Munn
Attorneys

United States Patent Office.

J. S. GRANT, OF SIDNEY CENTRE, MAINE.

Letters Patent No. 68,500, dated September 3, 1867.

IMPROVEMENT IN HORSE-RAKES.

The Schedule referred to in these Letters Patent and making part of the same.

TO ALL WHOM IT MAY CONCERN:

Be it known that I, J. S. GRANT, of Sidney Centre, in the county of Kennebec, and State of Maine, have invented a new and improved Hand Hay-Rake; and I do hereby declare that the following is a full, clear, and exact description thereof, which will enable those skilled in the art to make and use the same, reference being had to the accompanying drawings, forming part of this specification, in which—

Figure 1 is a plan of my improved hand-rake.

Figure 2 is a side view of the same.

Similar letters of reference indicate corresponding parts.

This invention relates to a new and improved hand-rake, designed for raking and gathering light grass and scatterings of hay from a cart or windrow; for gathering grain straw from the swath into gavels for binding, and also for gleaning in the grain-field, especially where the stubble is cut high, all of which work is accomplished without stopping or lifting the rake from the ground.

A is the rake-head, a square bar of light, strong timber, in which a set of wire teeth $a\ a$, bent in semicircular form, are rigidly fastened at regular distances apart, as shown in fig. 1. On the ends of the rake-head A are firmly attached wire shoes or rocker supports $b\ b$, for carrying the rake above the ground when the rake-teeth are lifted, as hereinafter described. These wire rockers $b\ b$ are formed by bending nearly in a semicircular form, but elongated, so that the extremity of the segment is further from the rake-head than any other part of the periphery, by which conformation the rake-teeth $a\ a$ will be raised a greater distance from the surface of the ground when the rake is turned up than they would if the rockers were formed in a true circle, for the purpose of securing greater clearance for the points of the teeth to pass over the hay or straw when it is dropped from the rake in swaths. E E' are two short arms, rigidly fastened to the under side of the rake-head A, which project forward and downward from its front. On the end of one of these arms E is rigidly connected a toothed quadrant, $c$. D is a V-forked handle, the prongs of which are pivoted to the two arms E E'. Near the front end of the handle D is pivoted a hand-lever, $d$, and a little further back, just in front of a cross-piece, $e$, in the fork, intended as a hold-fast, is pivoted another short lever, $g$. A spring-dog, $h$, is attached to one fork of the handle, so as to engage in the segment rack $c$ for holding the handle firmly in connection with the rake-head A, and releasing it when required. Attached to the head A, and extending under two or more of the rake-teeth $a\ a$, is fixed a wire brace, $i$, to which is fastened one end of a cord, $k$, that passes along the handle D and connects with the lever $d$, thence with the lever $g$, and thence with the spring-dog $h$. On the cord $k$ is placed an adjustable ball or knob, $m$, for the hand to hold as required to operate the rake. By this arrangement of the handle and the cord and levers, in connection with the spring-dog and the segmental rack, my improved rake at once possesses the advantages of a rigid connection between the rake-head and the handle while the rake is at work, and of a flexible movement, which instantly releases the teeth from its load without stopping the operator.

When the rake is used, the spring-dog $h$ is allowed to engage in the segmental rack $c$ at some point suitable to the height of the operator, and in such manner that the points of the rake-teeth $a\ a$ will trail on the ground and rake the hay as desired. Whenever it is necessary to discharge the load on the rake, while one hand holds the rake-handle D, the fingers at the same time press on the lever $d$, which disengages the dog $h$ from the rack $c$, and allows the rake-head to be turned up by drawing on the cord $k$ with the other hand, which seizes the knob $m$. This operation raises the rake-head on the rockers $b\ b$, and elevates the points of the rake-teeth so as to drop and clear the load while the operator advances. The work of raking is thus proceeded with, and, as will be seen, is performed very expeditiously at great saving of labor over the ordinary hand-rake.

Having thus described my invention, what I claim as new, and desire to secure by Letters Patent, is—

1. The shoes or rockers $b\ b$, in combination with the rake-head A, arranged and operating as and for the purpose herein described.

2. The forked handle D, having its prongs pivoted to the arms E E' on the rake-head A, in combination with the segment-rack $c$, the spring-dog $h$, the levers $d\ g$, the cord $k$, provided with the knob-handle $m$, and the lifting-brace $i$, constructed, arranged, and operating as and for the purposes herein set forth.

J. S. GRANT.

Witnesses:
GEO. V. WEEKS,
B. LIBBY.